US009485293B2

(12) United States Patent
McGowan et al.

(10) Patent No.: US 9,485,293 B2
(45) Date of Patent: *Nov. 1, 2016

(54) DYNAMIC CHUNK MANIPULATION FOR STREAMING MIXED MEDIA: APPLICATION PROGRAMMING INTERFACE

(71) Applicant: BRIGHTCOVE INC., Boston, MA (US)

(72) Inventors: Albert John McGowan, Phoenix, AZ (US); Nicholas Maultsby, Phoenix, AZ (US); Jared Marshall, Tempe, AZ (US)

(73) Assignee: BRIGHTCOVE, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,368

(22) Filed: Oct. 20, 2015

(65) Prior Publication Data
US 2016/0099992 A1  Apr. 7, 2016

Related U.S. Application Data

(63) Continuation of application No. 14/086,801, filed on Nov. 21, 2013, now Pat. No. 9,197,688.

(60) Provisional application No. 61/884,709, filed on Sep. 30, 2013.

(51) Int. Cl.
G06F 15/16 (2006.01)
H04L 29/06 (2006.01)
H04N 21/234 (2011.01)
(Continued)

(52) U.S. Cl.
CPC ............ H04L 65/60 (2013.01); G11B 27/10 (2013.01); H04N 21/2393 (2013.01); H04N 21/23424 (2013.01); H04N 21/242 (2013.01); H04N 21/4302 (2013.01); H04N 21/44016 (2013.01);
(Continued)

(58) Field of Classification Search
CPC ............ H04L 65/60; H04N 21/44016; H04N 21/23424; H04N 21/812
USPC ........................................................ 709/219
See application file for complete search history.

(56) References Cited

U.S. PATENT DOCUMENTS 7,203,758 B2  4/2007  Cook et al.
8,145,782 B2  3/2012  McGowan et al.
(Continued)

FOREIGN PATENT DOCUMENTS

WO    2015/047959 A1    4/2015

OTHER PUBLICATIONS

International Search Report and Written Opinion for PCT/US2014/056823 mailed Dec. 9, 2014, 10 pages.
(Continued)

Primary Examiner — Tauqir Hussain
(74) Attorney, Agent, or Firm — Kilpatrick Townsend & Stockton LLP

(57) ABSTRACT

Timestamps for streams of media that transition from one media source to another (such as from live content to on-demand content, and vice versa) can be rewritten by a server to help ensure error-free streaming by the client. Embodiments can coordinate the creation of a client manifest with the dynamic creation of a requested segment of media (i.e., "chunk") to determine how to rewrite timestamps of requested chunks such that they are continuous through the transition.

20 Claims, 8 Drawing Sheets

(51) Int. Cl.
*H04N 21/44* (2011.01)
*H04N 21/81* (2011.01)
*G11B 27/10* (2006.01)
*H04N 21/239* (2011.01)
*H04N 21/242* (2011.01)
*H04N 21/43* (2011.01)
*H04N 21/845* (2011.01)

(52) U.S. Cl.
CPC ........ *H04N 21/812* (2013.01); *H04N 21/8456* (2013.01)

(56) References Cited

U.S. PATENT DOCUMENTS

| | | | |
|---|---|---|---|
| 8,301,733 | B2 | 10/2012 | McGowan |
| 8,327,013 | B2 | 12/2012 | McGowan et al. |
| 9,197,688 | B2 | 11/2015 | McGowan et al. |
| 2003/0018966 | A1* | 1/2003 | Cook ............... H04N 7/165 725/2 |
| 2010/0169303 | A1 | 7/2010 | Biderman et al. |
| 2010/0179987 | A1 | 7/2010 | Sebastian et al. |
| 2011/0264506 | A1 | 10/2011 | Grant et al. |
| 2012/0047542 | A1 | 2/2012 | Lewis et al. |
| 2012/0110117 | A1* | 5/2012 | Koreeda ........... H04L 65/4084 709/217 |
| 2012/0179788 | A1* | 7/2012 | McGowan ....... H04N 21/44222 709/219 |
| 2013/0080268 | A1* | 3/2013 | Gordon ............... G06Q 30/02 705/14.73 |
| 2013/0080579 | A1* | 3/2013 | Gordon ............. H04L 65/608 709/217 |
| 2013/0083859 | A1* | 4/2013 | Nemiroff ......... H04N 21/4305 375/240.25 |
| 2013/0110978 | A1 | 5/2013 | Gordon et al. |
| 2013/0219428 | A1 | 8/2013 | Jennings et al. |
| 2013/0317919 | A1 | 11/2013 | Raman et al. |
| 2014/0150019 | A1 | 5/2014 | Ma et al. |
| 2014/0189139 | A1 | 7/2014 | Cheng et al. |
| 2014/0316899 | A1 | 10/2014 | McGowan et al. |
| 2014/0372624 | A1 | 12/2014 | Wang et al. |
| 2015/0095461 | A1 | 4/2015 | McGowan et al. |
| 2015/0095511 | A1 | 4/2015 | McGowan et al. |

OTHER PUBLICATIONS

U.S. Appl. No. 14/086,801, filed Nov. 21, 2013, Preinterview first office action mailed Feb. 20, 2014, 15 pages.
U.S. Appl. No. 14/086,801, filed Nov. 21, 2013, Non-Final Rejection mailed Jul. 9, 2014, 15 pages.
U.S. Appl. No. 14/086,801, filed Nov. 21, 2013, Final Rejection mailed Oct. 24, 2014, 20 pages.
U.S. Appl. No. 14/086,801, filed Nov. 21, 2013, Non-Final Rejection mailed Apr. 8, 2015, 28 pages.
U.S. Appl. No. 14/086,801, filed Nov. 21, 2013, Notice of Allowence mailed Jul. 22, 2015, 31 pages.
U.S. Appl. No. 14/086,822, filed Nov. 21, 2013, Preinterview first office action mailed Feb. 14, 2014, 16 pages.
U.S. Appl. No. 14/086,822, filed Nov. 21, 2013, Non-Final Rejection mailed Jul. 9, 2014, 14 pages.
U.S. Appl. No. 14/086,822, filed Nov. 21, 2013, Final Rejection mailed Oct. 28, 2014, 20 pages.
U.S. Appl. No. 14/086,822, filed Nov. 21, 2013, Non-Final Rejection mailed Jun. 19, 2015, 28 pages.
U.S. Appl. No. 14/086,822, filed Nov. 21, 2013, Notice of Allowance mailed Dec. 24, 2015, 29 pages.

* cited by examiner

DYNAMIC CHUNK MANIPULATION FOR STREAMING MIXED MEDIA: APPLICATION PROGRAMMING INTERFACE

This application is a continuation of application Ser. No. 14/086,801, filed Nov. 21, 2013, entitled "DYNAMIC CHUNK MANIPULATION FOR STREAMING MIXED LIVE AND ON-DEMAND MEDIA: APPLICATION PROGRAMMING INTERFACE," which claims the benefit of U.S. Provisional Application No. 61/884,709, entitled "DYNAMIC CHUNK MANIPULATION FOR STREAMING MIXED LIVE AND ON-DEMAND MEDIA," filed Sep. 30, 2013. The above-listed applications are hereby incorporated by reference in their entirety for all purposes.

Additionally, application Ser. No. 14/086,822, filed Nov. 21, 2013, entitled "DYNAMIC CHUNK MANIPULATION FOR STREAMING MIXED LIVE AND ON-DEMAND MEDIA: DYNAMIC PERMUTATION LAYER" is incorporated by reference into this application for all purposes:

BACKGROUND OF THE INVENTION

The delivery of media over data networks such as the Internet is in high demand. This is due, in large part, to much of the media being advertisement ("ad") supported. This even applies to streamed live content.

The insertion of ads and other on-demand content into a stream of live content can be difficult. The unpredictable nature of live content can result in corresponding unpredictability of points in the live content at which ads may be shown. Furthermore, because live content can be generated for hours, weeks, or longer, the timestamps associated with live will not be synchronized with the timestamps of ads (or other on-demand content) inserted into the stream of live content. This can cause problems for some clients during playback.

BRIEF SUMMARY OF THE INVENTION

Techniques disclosed herein provide for dynamically rewriting the timestamps in streams of media that transition from one source to another (such as from live content to on-demand content, and vice versa). Embodiments can coordinate the creation of a client manifest with the dynamic creation of a requested segment of media (i.e., "chunk") to determine how to rewrite timestamps of requested chunks are continuous through the transition.

An example method of providing media streaming via a data communications network, according to the disclosure, includes receiving a stream of data representing live media content, obtaining timing information of the stream of data, and receiving, via the data communications network, a request to stream the live media content. The method further includes creating, with a processing unit, a manifest file where the manifest file includes information for streaming one or more segments of the live media content via the data communications network, the manifest file also includes information for streaming one or more segments of a media file, distinct from the live media content, and the manifest file further includes offset information for streaming the one or more segments of the media file, the offset information based on the timing information of the stream of data. The method further includes and sending, via the data communications network, the manifest file.

The method of providing media streaming via a data communications network can include one or more of the following features. The method can include providing an application programming interface (API), where request to stream the live media content is received via the API. Creating the manifest file further can include providing, in the manifest file, an indication of a discontinuity in the stream of the live media content. The method can also include determining a type of client associated with the request to stream the live media content, where providing the indication of the discontinuity is based on the determination of the type of client. Obtaining the timing information of the stream of data can include sending a request for the timing information, and receiving a response to the request, the response including the timing information. The method can also include receiving an indication of a period of time in the live media content designated for advertising, where sending the request for the timing information is based on the receipt of the indication of the period of time in the live media content designated for advertising. The timing information of the stream of data can include one or more timestamps associated with one or more segments of the stream of data.

An example server for providing media streaming via a data communications network, according to the disclosure, includes a communications interface, a memory, and a processing unit coupled to the communications interface and the memory. The processing unit is configured to cause the server to receive a stream of data representing live media content, obtain timing information of the stream of data, and receive, via the communications interface, a request to stream the live media content. The processing unit is further configured to create a manifest file where the manifest file includes information for streaming one or more segments of the live media content via the data communications network, the manifest file also includes information for streaming one or more segments of a media file, distinct from the live media content, and the manifest file further includes offset information for streaming the one or more segments of the media file, the offset information based on the timing information of the stream of data. The processing unit is also configured to send, via the communications interface, the manifest file.

The server for providing media streaming via a data communications network can include one or more of the following features. The processing unit can be further configured to cause the server to provide an application programming interface (API), wherein request to stream the live media content is received via the API. The processing unit can be configured to cause the server to create the manifest file by providing, in the manifest file, an indication of a discontinuity in the stream of the live media content. The processing unit can be further configured to cause the server to determine a type of client associated with the request to stream the live media content where providing the indication of the discontinuity is based on the determination of the type of client. The processing unit can be configured to cause the server to obtain the timing information of the stream of data by sending a request for the timing information, and receiving a response to the request, the response including the timing information. The processing unit can be further configured to cause the server to receive an indication of a period of time in the live media content designated for advertising where sending the request for the timing information is based on the receipt of the indication of the period of time in the live media content designated for advertising. The timing information of the stream of data can include one or more timestamps associated with one or more segments of the stream of data.

An example non-transitory computer-readable medium, according to the disclosure, has instructions embedded thereon for providing media streaming via a data communications network. The instructions, when executed by a computer, cause the computer to perform functions including: receiving a stream of data representing live media content, obtaining timing information of the stream of data, and receiving a request to stream the live media content. The functions further include creating a manifest file, where the manifest file includes information for streaming one or more segments of the live media content via the data communications network, the manifest file also includes information for streaming one or more segments of a media file, distinct from the live media content, and the manifest file further includes offset information for streaming the one or more segments of the media file, the offset information based on the timing information of the stream of data. The functions also include sending the manifest file.

The computer-readable medium can include one or more of the following features. The computer-readable medium can include instructions for causing the computer to provide an application programming interface (API), wherein request to stream the live media content is received via the API. The instructions for creating the manifest file can further include instructions for providing, in the manifest file, an indication of a discontinuity in the stream of the live media content. The computer-readable medium can include instructions for causing the computer to determine a type of client associated with the request to stream the live media content, where providing the indication of the discontinuity is based on the determination of the type of client. The instructions for obtaining the timing information of the stream of data can further include instructions for causing the computer to send a request for the timing information, and receive a response to the request, the response including the timing information. The computer-readable medium can include instructions for causing the computer to receive an indication of a period of time in the live media content designated for advertising where sending the request for the timing information is based on the receipt of the indication of the period of time in the live media content designated for advertising.

Items and/or techniques described herein may provide one or more of the following capabilities, as well as other capabilities not mentioned. Techniques allow for a client to transition from one source of streaming media to another without incurring errors due to inconsistencies in the timestamps of chunks between the two sources of media. Techniques can be dynamically executed on the fly and customized for each client. These and other embodiments, along with many of its advantages and features, are described in more detail in conjunction with the text below and attached figures.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing various embodiments of the invention. It is understood that various changes may be made in the function and arrangement of elements without departing from the spirit and scope as set forth in the appended claims.

The terms "ad" and "advertisement," including alternate forms thereof, refer to marketing content distinct from user-requested media content. Although the techniques described herein discuss obtaining and providing advertising data, they also can be applied to data for content other than advertising, such as other on-demand content. Furthermore, although techniques described herein are often provided in the context of video streaming, they can be applied to other forms of media content (e.g., audio streaming) as well. A person of ordinary skill in the art will recognize many alternate applications.

It can be noted that, although embodiments disclosed herein describe techniques as implemented by a cloud-hosted integrated multi-node pipelining system (CHIMPS), embodiments are not so limited. Other systems may be configured to implement the techniques disclosed.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Much of this media is ad-supported, allowing media content providers to receive advertising revenue from media content, while often allowing end users to consume the media content free of charge.

Figure 1:
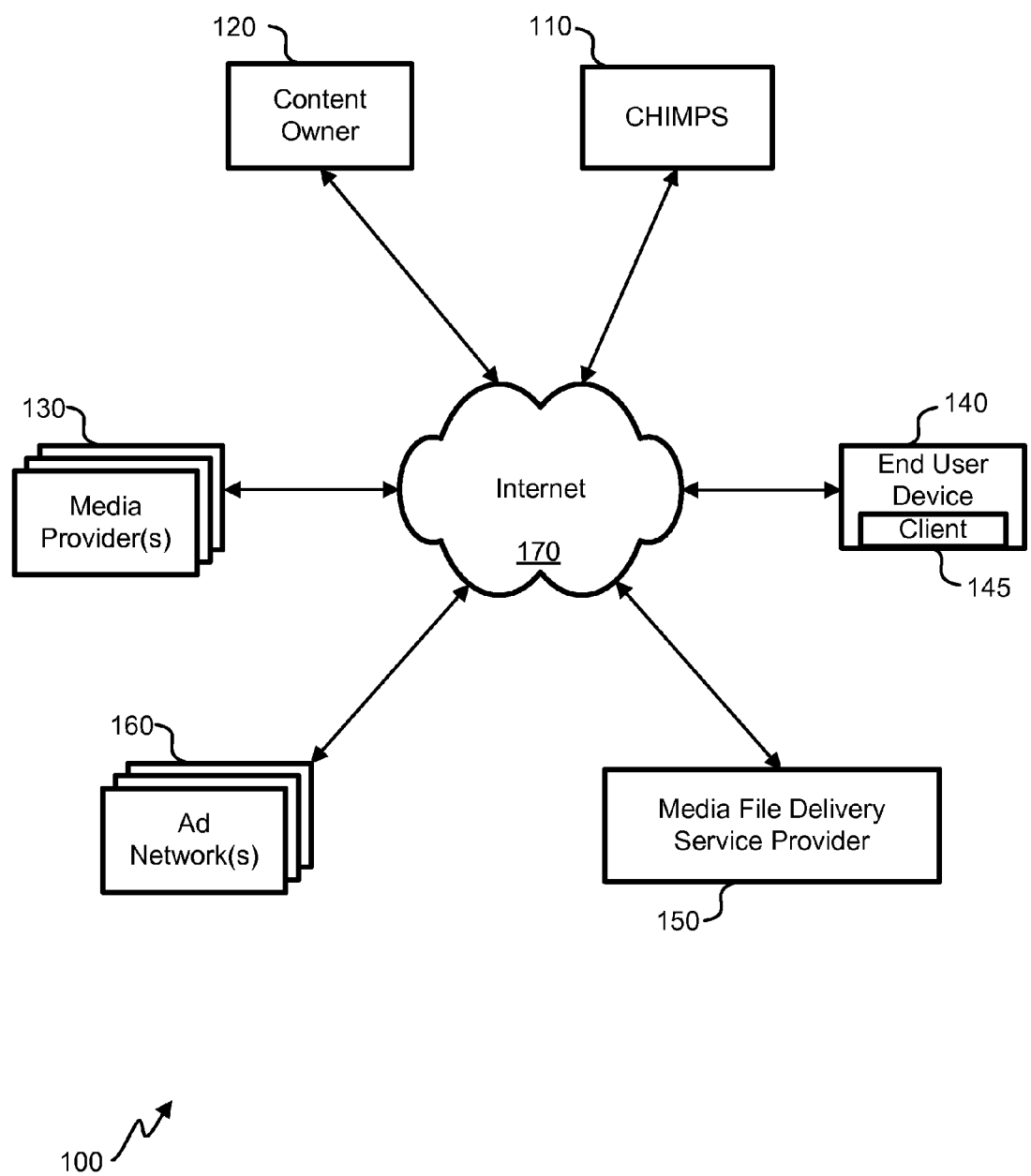
FIG. 1 is a block diagram illustrating a media servicing system, according to some embodiments of the present invention.

Advertisements are often stored and maintained separate from the primary media content. The distribution of ad-supported media via the Internet can therefore involve a variety of entities. FIG. 1 is a block diagram illustrating a media servicing system 100, according to some embodiments of the present invention. The system may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game system, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

For on-demand content (e.g., requested media that is stored in its entirety), a media file provided by one or more media providers 130 can be processed and indexed by cloud-hosted integrated multi-node pipelining system (CHIMPS) 110. The media file may be stored on media file delivery service provider (MFDSP) 150, such as a content delivery network, media streaming service provider, cloud data services provider, or other third-party media file delivery service provider. Additionally or alternatively, the CHIMPS 110 may also be adapted to store the media file. On-demand content can be provided to the client 145 via progressive downloading and/or streaming.

For purposes of this disclosure, advertising content can be considered a form of on-demand content that is distributed much the same way. (As previously mentioned, techniques for interleaving live and on-demand content apply not only to inserting ads into live content, but can apply to inserting any form of on-demand content, including non-advertisement content as well.) Rather than media providers, however, ad content can come from ad networks 160. Furthermore, the ad networks 160 may determine what ads to provide at a given point in time for a given client 145 by implementing business rules.

For live content (e.g., requested content that is sent to one or more end user devices 140 as it is received from media provider(s) 130, that is, in real time or near-real time, depending on processing times and/or other buffer times), a similar process can take place. For example, media provider(s) 130 can provide a media stream (e.g., live video), which is processed and indexed by the CHIMPS 110. Encoded segments of the media stream can be stored as files (i.e., "chunks"), on the media file delivery service provider (MFDSP) 150 and/or the CHIMPS 110. Embodiments may have a delay from the time the media stream is received to the time the associated content is stored and available for streaming to the one or more end user devices 140. The delay can be due to transcoding and/or other types of processing for making the received media stream available for downloading. This delay can create a buffer period of time in which one or more of the techniques described herein can take place, such as processing cue tones and/or placing ads in the content. (These techniques are described in greater detail below.)

Both on-demand and live content can utilize any of a variety of forms of streaming media. One such method is chunk-based media streaming in which a media file or live stream is processed into smaller chunks and stored (e.g., in a server of the CHIMPS 110 or Media File Delivery Service Provider 150) for serving to a client 145. The client 145 can make a URL request to the CHIMPS 110, which can provide a manifest file (also known as an index file) indicating the locations of each of the chunks of media using, for example, Uniform Resource Indicators (URIs) (e.g., Universal Resource Locators (URLs)) or other indicators. The client 145 can then use the information in the manifest file to stream the media content, following one location after the other to download each chunk of media. The client may sequentially request and receive multiple manifest files to stream requested media content. This is especially true for live media, where the live stream might still be received and processed by the CHIMPS 110 when the client makes the request for the manifest file. Additional detail regarding such chunking and indexing, as well as techniques for dynamically creating chunks and manifest files, can be found in U.S. Pat. No. 8,327,013 entitled "Dynamic Index File Creation for Media Streaming" and U.S. Pat. No. 8,145,782, entitled "Dynamic Chunking For Media Streaming," both of which are incorporated by reference herein in their entirety.

The CHIMPS 110 can further manage the processing and syndication of media (live or on-demand) received from the media provider(s) 130. For example, the CHIMPS 110 can provide transcoding and other services to enable media provided by the media provider(s) to be distributed in a variety of formats to a variety of different device types in a variety of locations. Furthermore, the CHIMPS 110 provide feedback to the media provider(s) 130 regarding the media's syndication, including user behavior during media playback. For example, the CHIMPS 110 can provide a media provider 130 with information indicating that end users tend to stop watching a video at a certain point in playback, or that users tend to follow links associated with certain advertisements displayed during playback. With this data, media provider(s) 130 can adjust factors such as media content, advertisement placement and content, etc., to increase revenue associated with the media content and provide the end user device 140 with a more desirable playback experience. Additionally or alternatively, the CHIMPS 110 can dynamically provide a customized playback experience on the end user device 140 according to aspects of the context associated with the content at the time of the request, aspects of the content request itself, or both. It can be noted that although embodiments herein may utilize media files and live streams explicitly, other embodiments may utilized other forms of media assets, such as dynamic web pages, and may incorporate multiple media elements, including players, user interface components, user controls and control components, images, and other media content, objects, or types. Additionally, it can be noted that various functions, operations, processes, or other aspects that are described in this example, and other examples, as being performed by or attributable to the CHIMPS 110 can be performed by another system operating in conjunction with the CHIMPS 110, loosely or tightly synchronized with the CHIMPS 110, or independently; for example, collecting data from other digital services to be combined and reported with data collected by the CHIMPS 110 can, in some implementations, be performed by a system other than the CHIMPS 110. Additional detail regarding the functionality of the CHIMPS 110 can be found in U.S. Pat. No. 8,301,733, entitled "Dynamic Chunking for Delivery Instances," which is incorporated by reference herein in its entirety.

A content owner 120 can utilize one or more media provider(s) 130 to distribute media content owned by the content owner 120. For example, a content owner 120 could be a movie studio that licenses distribution of certain media through various media providers 130 such as television networks, Internet media streaming websites and other on-demand media providers, media conglomerates, and the like.

In some configurations, the content owner 120 also can operate as a media provider 130.

The content owner 120 and/or media provider(s) 130 can enter into an agreement with one or more ad network(s) 160 to provide advertisements to numerous clients 145 on numerous end user devices 140. In this manner, the ad network(s) 160 allow companies to show advertisements to end users viewing the media content from the media provider(s) 130. Because ad network(s) 160 can maintain advertisements and/or advertisement data separate from media content, the advertisements can be updated and—as previously indicated—subject to business rules such that, two users viewing the same media content at different times and/or in different locations may see different advertisements.

Advertisements may be inserted directly into content consumed by the client, depending on the streaming techniques utilized. In such cases, a Live Advertising Processing Engine Service (APES) can be utilized to provide the client with advanced functionality for advertising during the consumption of live content by a client. Additional details regarding Live APES can be can be found in U.S. patent application Ser. No. 14/069,961 entitled "Live Advertising Processing Engine Service," which is incorporated by reference herein in its entirety.

The insertion of ads directly into content consumed by the client can cause playback issues in at least some types of clients. One such issue can arise from the mismatch between timestamps of the live media (e.g., presentation timestamp (PTS) values) and those of the ad. Some clients will incur playback errors when encountering such mismatches. Techniques disclosed herein can provide for dynamically re-writing timestamps for on-demand (e.g., ad) content into stream of live content, which can prevent these playback errors from occurring.

Although embodiments provided herein discuss dynamically re-writing timestamps for inserting on-demand media into live content, embodiments are not so limited. Principles provided herein can be extended to embodiments that insert live content into on-demand media, a first on-demand media into a second on-demand media, first live content into second live content, and so forth. A person of ordinary skill in the art will recognize many substitutions, additions, omissions, and other variations to the embodiments provided herein.

Figure 2:
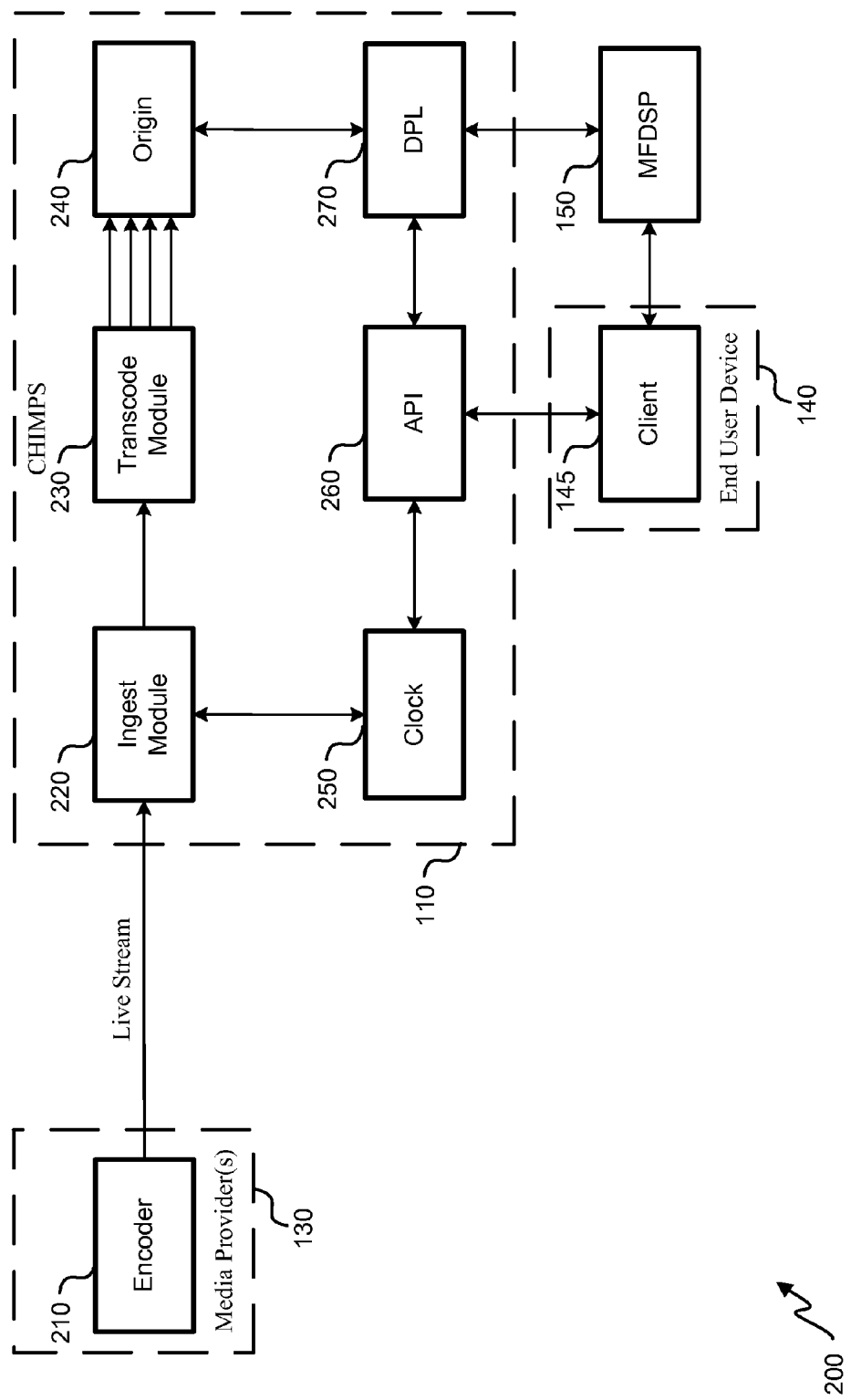
FIG. 2 is a functional block diagram illustrating a system configured to provide dynamic chunk manipulation according one embodiment.

FIG. 2 is a functional block diagram illustrating a system 200 configured to provide dynamic chunk manipulation, including timestamp rewriting techniques provided herein, according one embodiment. The system 200 can comprise a client 145, MFDSP 150, application programming interface (API) 260, dynamic permutation layer (DPL) 270 origin 240, transcode module 230, clock 250, ingest module 220, and encoder 210, and one or more ad servers 310. As shown, these components can be executed by and/or incorporated into larger systems, such as the end user device 140, CHIMPS 110, and/or media provider(s) 130 as shown in FIG. 1. In other embodiments, however, the illustrated components may be incorporated differently into a larger system and/or may be stand-alone components. Furthermore, other embodiments may combine, separate, add, omit, substitute, and/or modify components of the system 200, while providing the same overall functionality as described herein. A person of ordinary skill in the art will recognize many substitutions, additions, omissions, and other variations to the embodiments provided herein.

In this embodiment, a live stream is provided by the encoder 210 in chunks (i.e., segments), each of which can each have a PTS value and/or other timing information as dictated by the encoder. Because live media can vary widely in duration, PTS values for the live stream can vary correspondingly. To help keep track of PTS values of the live stream received by the ingest module 220, a local clock 250 can be used. For example, a "source manifest" can be created by recording the times at which chunks (having unique PTS values) of the live stream are received from the live stream source (i.e., the encoder 210). This source manifest can then be used by other components, such as the API 260, to determine which chunk was received at a given local time.

Ingested chunks are then provided to the transcode module 230, which transcodes the chunks into various formats according to a variety of different media profiles. Media profiles can determine bit rate, resolution, frame rate, and other media characteristics that can accommodate the various types of networks, clients, and/or end user devices used to stream the live content. For example, chunks with lower bit rates are generally used to stream the live content to an end user device 140 that has a poor network connection or low-resolution display, whereas chunks with higher bit rates are generally used to stream the live content to an end user device 140 that has a good network connection or high-resolution display.

The various chunks are stored in the origin 240. The origin 240 can be a data storage comprising one or more physical storage devices, which can be distributed geographically, and may be local to and/or remote from the transcode module 230 and/or DPL, depending on desired functionality. The origin 240 can further store and/or manage an "origin manifest" that records information regarding the available media profiles of the stored chunks and their corresponding PTS values. Thus, together with the source manifest, the origin manifest can be used to track the time at which each chunk of the live stream is received and determine the available media profiles of the corresponding chunks stored in the origin 240.

The client 145 can request to stream content of the live stream from the API 260 by, for example, following a URL received from the media provider(s) 130. (This URL, or other URI, may be provided to the media provider(s) 130 by the CHIMPS 110, indicating an Internet location at which the live stream may be accessed.) The API 260, upon receiving the client's request, can create a client manifest (also known as an index file), comprising a list of links (e.g., URLs) to chunks of the live content. Once it receives the client manifest from the API 260, the client 145 can request the chunks from the MFDSP 150. If a chunk is not already cached at the MFDSP 150, the chunk request can be relayed to the DPL, which can dynamically create the requested chunk (e.g., at runtime) by retrieving one or more corresponding chunks stored at the origin 240, relaying it back to the MFDSP 150, which can then provide the requested chunk to the client 145. Because the DPL can create requested chunks on the fly, the requested chunks can be customized according to each request. For example, although chunks stored at the origin 240 may comprise a five-second segment of the live content, a client may request a 20-second chunk, in which case the DPL 270 can retrieve a plurality of five-second chunks from the origin corresponding to the requested 20-second chunk and dynamically create the requested chunk and provide the requested chunk to the MFDSP 150. (Additional detail regarding such chunking can be found in U.S. Pat. No. 8,145,782, which is incorporated herein above.) Because the API 260 creates the client manifest used by the client 145 to request chunks, it is the API 260 that determines which chunks are requested and when. The API 260 can therefore craft client manifests to dictate at what point in the live content clients will begin streaming and the length of the chunks each client requests.

This ability to dynamically create both client manifests and requested chunks can also enable the system 200 to rewrite timestamps on the requested chunks to help ensure a client 145 receives a stream of chunks with continuous time stamps when streaming live content containing interleaved on-demand content, such as advertisements.

Figure 3:
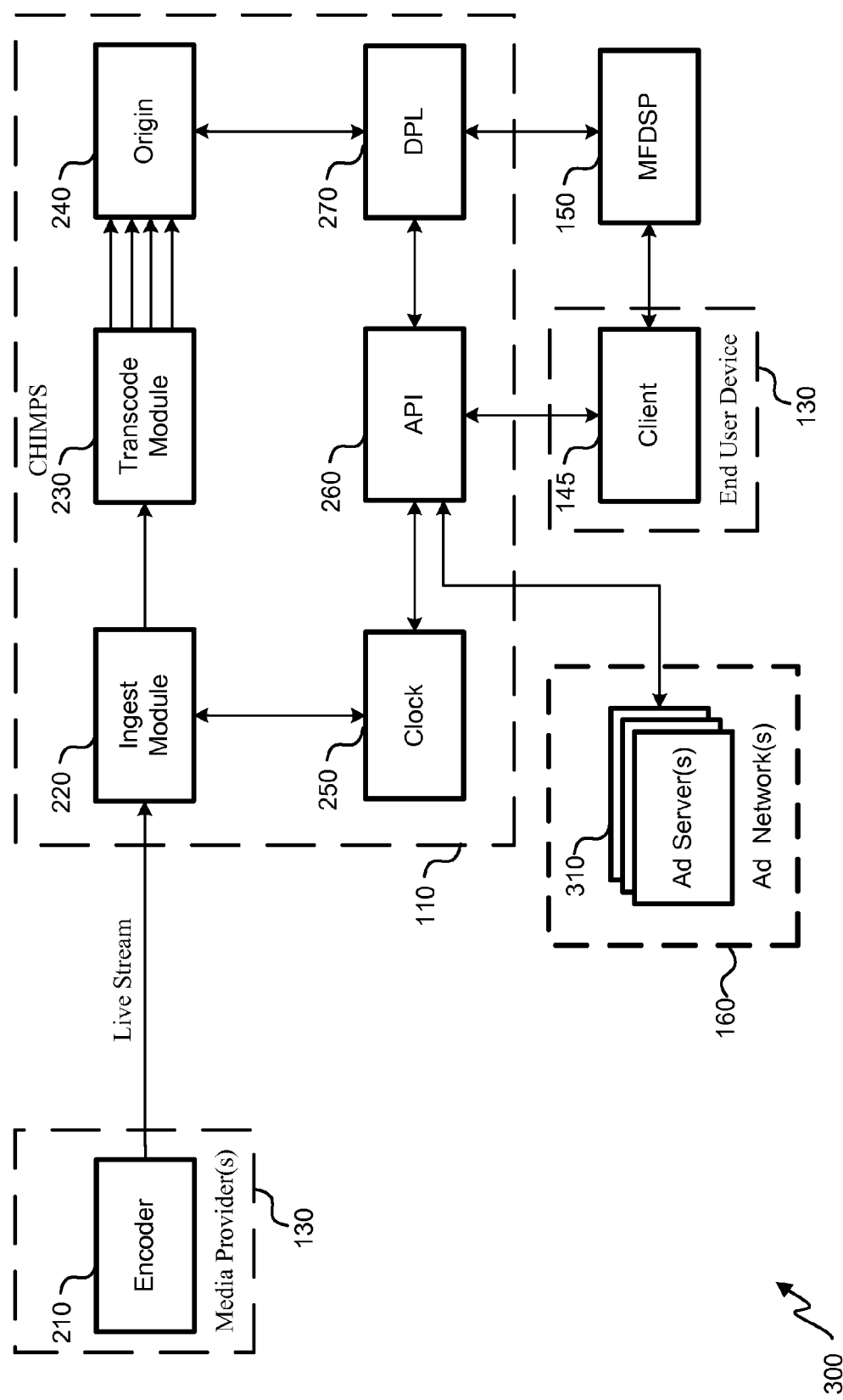
FIG. 3 is a functional block diagram of a system, similar to the system of FIG. 2, incorporating ad server(s).

FIG. 3 illustrates how a system 300, similar to the system 200 of FIG. 2, can incorporate ad server(s) 310 to determine which ads to insert into a stream of live content. Here, the ad server(s) 310 can be maintained by one or more ad network(s) 160, which may have an agreement with the media provider(s) 130 regarding which ads to run during an ad break of a live stream. In some embodiments, the DPL 270 may communicate with the ad server(s) 310 to obtain the ad content for the ads to run.

A typical live stream can consist of continuous data including one or more "content" segments (e.g. a sporting event, a news report, etc.), followed by a first advertising "break" during which advertising is intended to be shown. After the first advertising break, there can be a second set of one or more content segments, a second advertising break, and so forth. Advertising breaks can be determined by the media provider(s) 130 and indicated by "cue tones," which are analog or digital signals which indicate in a first form that a break is about to begin. Cue tones can also indicate in a second form that the break is about to end. These cue tones can occur at any point in the stream, and in many circumstances the timing of the breaks is not known before the live stream is initiated.

The API 260 can determine when advertisements are needed (e.g., by receiving a cue tone) and generate a manifest file accordingly. As previously indicated, the processing of a live stream (e.g., ingest and transcode) can take time, causing a buffer period between when a live stream is ingested to when the live content is provided to the client. This buffer period can provide the API 260 with enough time to determine that a cue tone has been detected at a certain point in the live stream and generate the client manifest which inserts advertisements at corresponding points in the live content provided to the client 145. Ad server(s) 310 can indicate to the API 260 which ad(s) to insert and, optionally, provide additional metadata regarding the ad(s). The ad content may also be provided by the ad server(s) 310 and previously stored as chunks at the origin 240 and/or other data storage, enabling the DPL 270 to dynamically manipulate requested ad chunks.

In some embodiments, when the API 260 determines an ad is to be inserted into live content provided to the client 145, it can request timing information from the DPL 270 for a corresponding chunk, such as a PTS value. The API 260 can therefore determine what PTS value corresponds to the point in the live stream at which an ad is to be inserted, and include offset information in the client manifest. When using the client manifest to request a chunk, the request provided by the client 145 to the MFDSP 150 (relayed to the DPL 270) can include metadata, including the offset information, signaling to the DPL 270 to rewrite the timestamps of the requested ad chunks so that the chunks provided to the client have continuous timestamps, despite changes between the live content and ad chunks.

Figure 4:
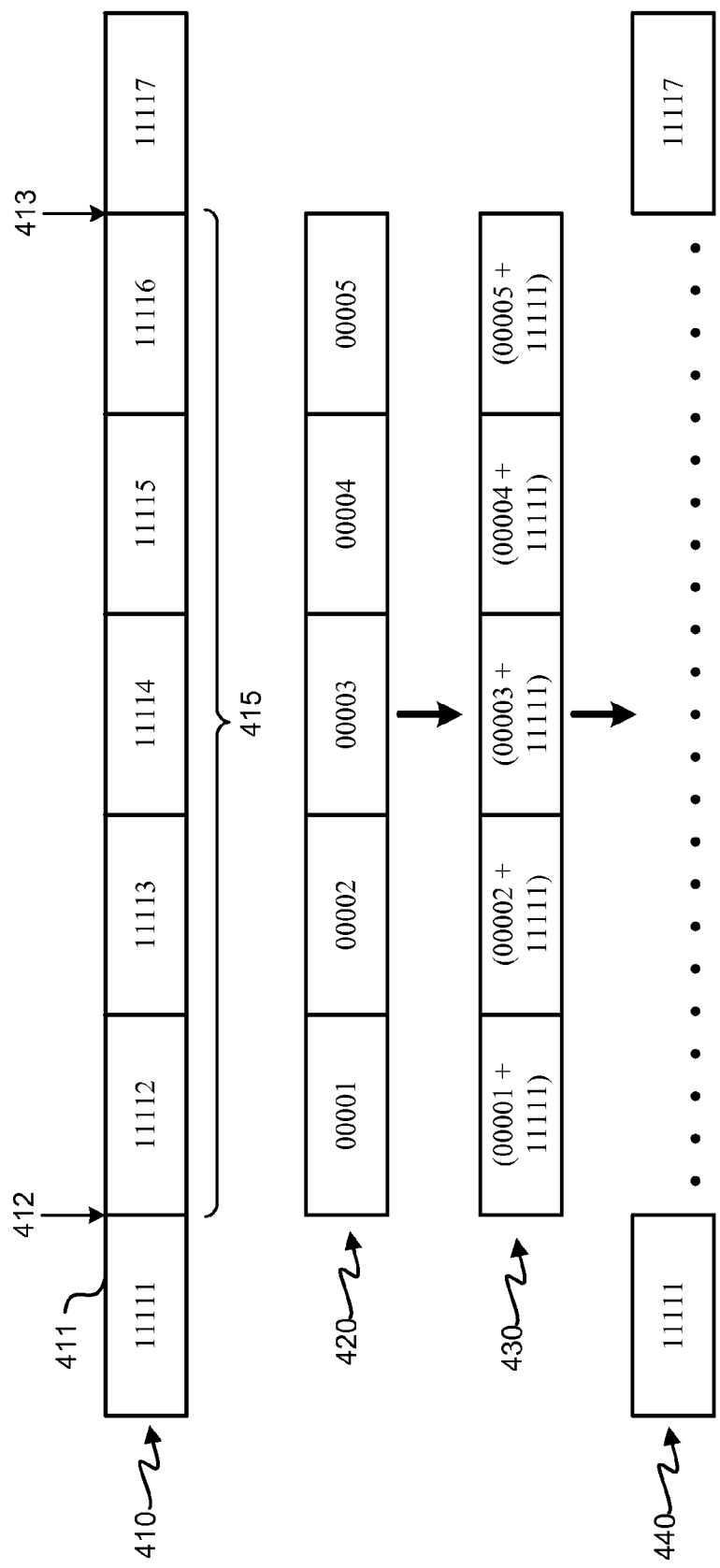
FIG. 4 is a simplified block diagram illustrating an example of how timestamps can be rewritten.

FIG. 4 is a simplified block diagram provided to help illustrate an example of how timestamps can be rewritten. In this illustration, the chunks of the live stream 410 have PTS (timestamp) values of 11111, 11112, etc. Cue tones associated with the live stream may be received, indicating to the API 260 a starting point 412 and ending point 413 for an advertisement. To replace the chunks of live content 415 between the starting point 412 and ending point 413 with ad chunks 420 (or other on-demand content), the API 260 can request information from the DPL 270 regarding the PTS value of the chunk 411 before the starting point 412, for example. (In other embodiments, the API 260 may receive timing information regarding other chunks.)

Using this timing information, the API 260 can create a client manifest with URLs that include offset information in parameter strings that reflects this timing information. For example, the offset information can include an indication of the PTS value and/or an indication of a number by which ad chunks 420 should be offset to match the PTS values of the live stream 410. When these URLs are used by the client 145 to request ad chunks from the DPL 270 (via the MFDSP 150), the DPL 270 can then determine, from the parameter strings, the offset information. The DPL 270 can then, each time an ad chunk is requested, retrieve the ad chunk from the origin 240, dynamically offset the ad chunks according to the offset information (as shown by chunk sequence 430) and provide the requested chunk to the client 145 (via the MFDSP 150). This ultimately results in the client 145 receiving a mixed stream of chunks 440 with continuous timestamps that includes both live and on-demand (e.g., ad) content.

It can be noted that the example provided in FIG. 4 is a simplified one. In practice, systems may employ variations on this basic technique to accommodate different scenarios. For example, ad chunks 420 may differ in length the chunks of the live stream 410. However, because the DPL 270 is able to dynamically create requested chunks from the ad chunks 420, it is also able to provide chunks of a requested length. The API 260 can ensure that the client manifest provided to the client 145 indicates the proper length of requested chunks so that they match the chunk length of the live stream 410.

Also, although an ending point 413 in the example of FIG. 4 is known at the time the API 260 creates the corresponding client manifest, this may not always be the case. Depending on ad break length, client manifest size, buffer times, and/or other factors, the client manifest may not include a transition back from ad content to live content. However, this information may simply be provided in a subsequent client manifest.

Additionally, although the example of FIG. 4 suggests matching PTS values of chunks of a live stream 410 as received from an encoder 210, this may not always be the case. PTS values may be modified (or replaced entirely) when transcoded by the transcode module 230. However, because the DPL 270 can provide timing information regarding the transcoded chunks as they are stored in the origin 240, this is not an issue. The chunks of the live stream 410 with modified PTS values are provided to the client 145, and the timestamp values of the ad chunks 420 are rewritten to match these modified PTS values.

In some embodiments, the API 260 may additionally include a discontinuity tag (or other indicator) in the client manifest to flag the transition from live to on-demand content (and/or vice versa). This can indicate to the client 145 to clear their video buffer, enabling the client 145 to make the transition without any playback errors. Because some clients may require the discontinuity tag while others may not, the API 260 can first determine the type of client 145 consuming the live content and provide a discontinuity tag if the determined client is of a type that would need such a tag.

Figure 5:
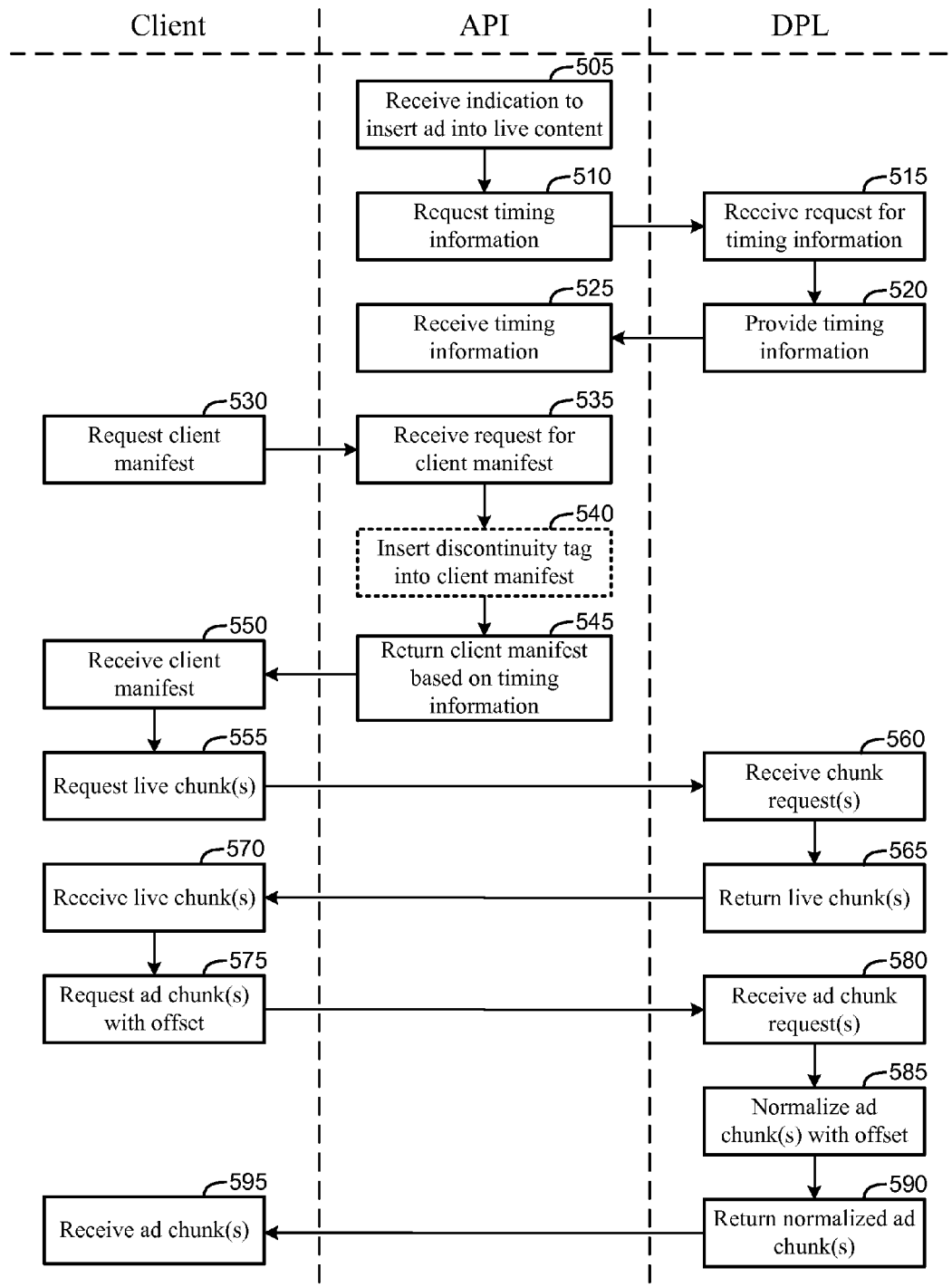
FIG. 5 is a swim-lane diagram illustrating example interactions between a client, API, and DPL.

FIG. 5 is a swim-lane diagram illustrating example interactions between a client, API, and DPL, such as the client 145, API 260, and DPL 270 illustrated in FIGS. 2 and 3. As with all other figures provided herein, FIG. 5 is provided as a non-limiting example. Embodiments of the invention may employ entities other than the client, API, and/or DPL, and/or may add, omit, substitute and/or otherwise alter the interactions illustrated in FIG. 5.

At block 505, the API receives an indication to insert an ad into a live content. The indication can be, for example, a cue tone in and/or related to a live stream of media and/or an indication that such a cue tone has been detected by another component (e.g., an ingest module). As described in previous embodiments, the API may maintain and/or have access to a database, list, or other data structure, enabling the API to determine a time in the live media an ad break in the live content begins.

At block 510, the API requests timing information from the DPL, and the request is received at block 515. Timing information can include information regarding the PTS value of a chunk and/or other information that can be used to determine an offset needed to ensure continuity in the timestamps of chunks when transitioning to and from live content to ad content. The timing information is provided by the DPL at block 520 and received at block 525.

At block 530 the client request a client manifest. Due to the nature of live content, which is being received and processed by a CHIMPS or other system at the same (or substantially the same) time it is being sent to the client, the client manifest typically contains only a portion of the live content available. Thus, in order to consume all or a larger portion of the live content, a client can request multiple client manifests in succession, requesting a new client manifest when the live content corresponding to a previous manifest is or soon will be completely consumed. Thus, the client manifest requested by the client at block 530 may be one of a series of client manifests requested by the client over a period of time while consuming the live content.

At block 535, the request for the client manifest is received by the API. Because the DPL is capable of dynamically manipulating chunks to accommodate chunk requests, the API can provide URLs (or other URIs) in the client manifest with parameter strings and/or other information that can be relayed to the DPL to dictate how the DPL manipulates the chunks that are ultimately provided to the client. Thus, the API can utilize the timing information received at block 525 to provide offset information in the client manifest to cause the DPL to rewrite timestamps of ad chunks inserted into the live content to ensure the timestamps received by the client are continuous. At block 545, the API can then return client manifest based on the timing information, which is received by the client at block 550.

Optionally, the API may insert a discontinuity tag into the client manifest, as shown at block 540. The location of the discontinuity tag may vary, depending on factors such as the streaming protocol and/or format of the client manifest. In some embodiments, for example, the discontinuity tag may simply be placed in between URLs on a sequential list of URLs in the client manifest that correspond to chunks to be consumed by a client. Thus, for transitions from live content to ad content, the discontinuity tag can follow URLs for chunks of live content and precede URLs for chunks of ad content. Depending on the needs of the client a discontinuity tag may additionally or alternatively be used in the transition back from ad content to live content, in a similar manner.

At block 555, the client uses the client manifest at block 550 to send a request for live chunk(s) (i.e., chunks of live content) from the DPL, which is received by the DPL at block 560. The DPL then prepares the live chunk(s), as detailed herein above, and returns the live chunk(s) at block 565, which are received by the client at block 570. (It will be understood that, where multiple chunks are requested, the process shown in blocks 555-570 is repeated for each chunk. That is, the client sends a separate request for each chunk requested.)

At block 575 the client uses the client manifest to send a request for ad chunk(s) (i.e., chunks of ad content) from the DPL, which is received by the DPL at block 580. (Again, It will be understood that, where multiple chunks are requested, the process shown in blocks 575-595 is repeated for each requested ad chunk.) Here, each chunk request can include offset information provided in the client manifest to indicate to the DPL how the timestamps should be rewritten to ensure the timestamps of the ad chunks provided to the client are continuous with the timestamps of the live chunks previously received by the client at block 570. At block 585, the DPL normalizes ad chunks accordingly, using the offset information to rewrite the timestamps of the ad chunks. At block 590 the DPL returns the normalized ad chunks, which are received by the client at block 595.

It can be noted that the manifest file provided by the API can accommodate various other scenarios. For example, a manifest file may cause the client to initially request ad chunk(s), rather than live chunk(s).

Figure 6:
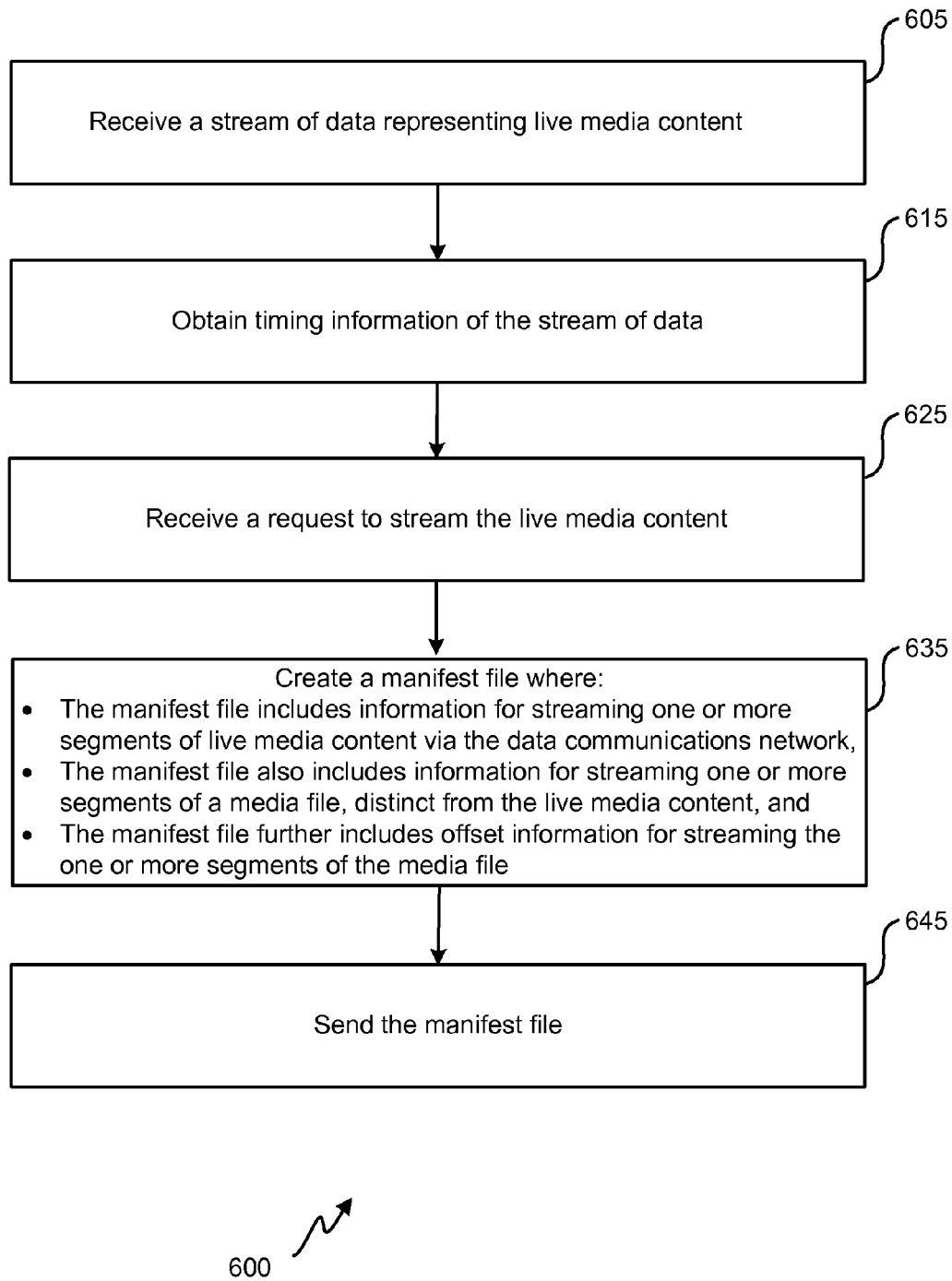
FIG. 6 is a simplified flow chart illustrating an example method of providing a manifest file in accordance techniques described herein.

FIG. 6 is a simplified flow chart illustrating an example method 600 of providing a manifest file in accordance with the techniques described above. The method 600 can be implemented, for example, by an API 260 and/or other components shown in FIGS. 2 and 3 above. As with all other figures provided herein, FIG. 6 is provided as an example and is not limiting. Various blocks may be combined, separated, and/or otherwise modified, depending on desired functionality. Furthermore, different blocks may be executed by different components of a system and/or different systems. Such systems can include the computer system, described herein below with regard to FIG. 8.

At block 605, a stream of data representing live media content is received. The stream of data can include a live stream received by an encoder of a media provider, and may be processed according to previously-described techniques.

At block 615, timing information of the stream of data is obtained. The timing information can include a PTS value or other information sufficient to determine offset information for timestamps of chunks of on-demand content inserted into the live media content.

At block 625 a request to stream the live media content is received. A request can include, for example, a request for a manifest file (e.g., a "client manifest" as described above).

The manifest file is created at block 635. Here, the manifest file includes information for streaming one or more segments of live media content via a data communications network, such as the Internet. Such information can include, for example, a list of URLs that can be used to request chunks of the live media content. The manifest file also includes information for streaming one or more segments of a media file, distinct from the live media content. The media file can include, for example, an advertisement or other on-demand content with timestamps that differ from the timestamps of the live media content. The manifest file further includes offset information for streaming the one or more segments of the media file. This offset information can be embedded in or otherwise associated with the URLs themselves, and can relay offset information to an entity, such as a DPL, when used by a client. Finally, the manifest file is sent at block 645.

Figure 7:
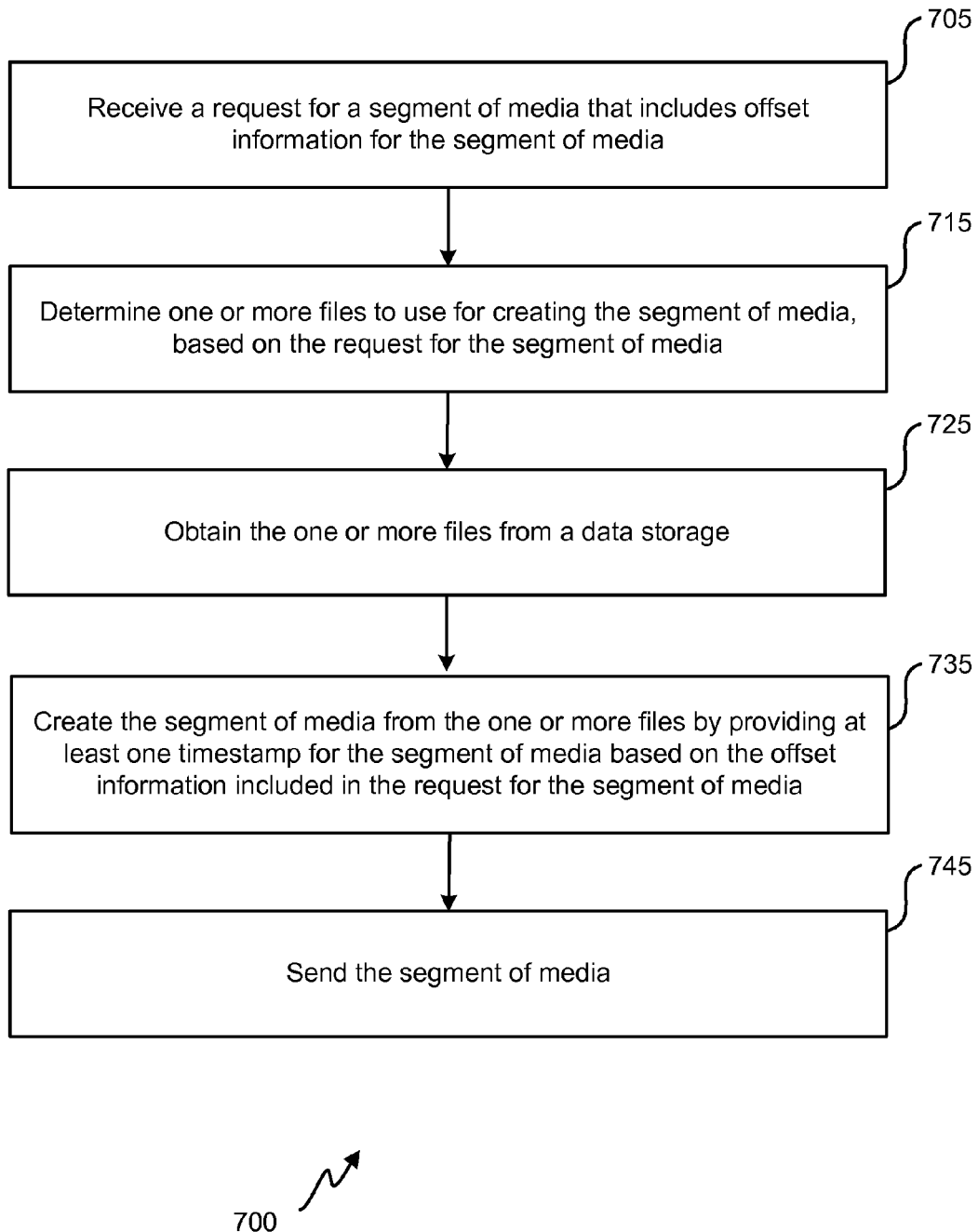
FIG. 7 is a simplified flow chart illustrating an example method of creating media chunks using offset information included in a request, in accordance with techniques described herein.

FIG. 7 is a simplified flow chart illustrating an example method 700 of creating media chunks using offset information included in a request, in accordance with the techniques described above. The method 700 can be implemented, for example, by a DPL 270 and/or other components shown in FIGS. 2 and 3 above. Different blocks may be executed by different components of a system and/or different systems. Such systems can include the computer system, described herein below with regard to FIG. 8.

At block 705, a request for a segment of media is received. The request includes offset information for the requested segment of media. As indicated above, the offset information can be any information that enables the timestamp of a requested chunk (i.e., segment of media) to be rewritten, allowing for continuity in the timestamps of chunks of the media being streamed.

Block 715 includes determining one or more files to use for creating the segment of media, based on the request for the segment of media. As described above, chunks may be dynamically crafted to accommodate requests. Because the contents (e.g., start/end times, lengths, etc.) of requested chunks may vary from the content of files (e.g., stored chunks) used to create the requested chunks, more than one files may be used to create the requested chunk.

At block 725, the one or more files are obtained from a data storage. The files may be stored at a local system, or may be retrieved from a remote system, such as an advertisement server, for example.

Block 735 includes creating the segment of media from the one or more files by providing at least one timestamp for the segment of media based on the offset information. Rewriting timestamps in this manner allows for continuity in the timestamps of chunks of the media being streamed when transitioning from one type of media (e.g., live) to another (e.g., on-demand). The segment of media is then sent at block 745.

Figure 8:
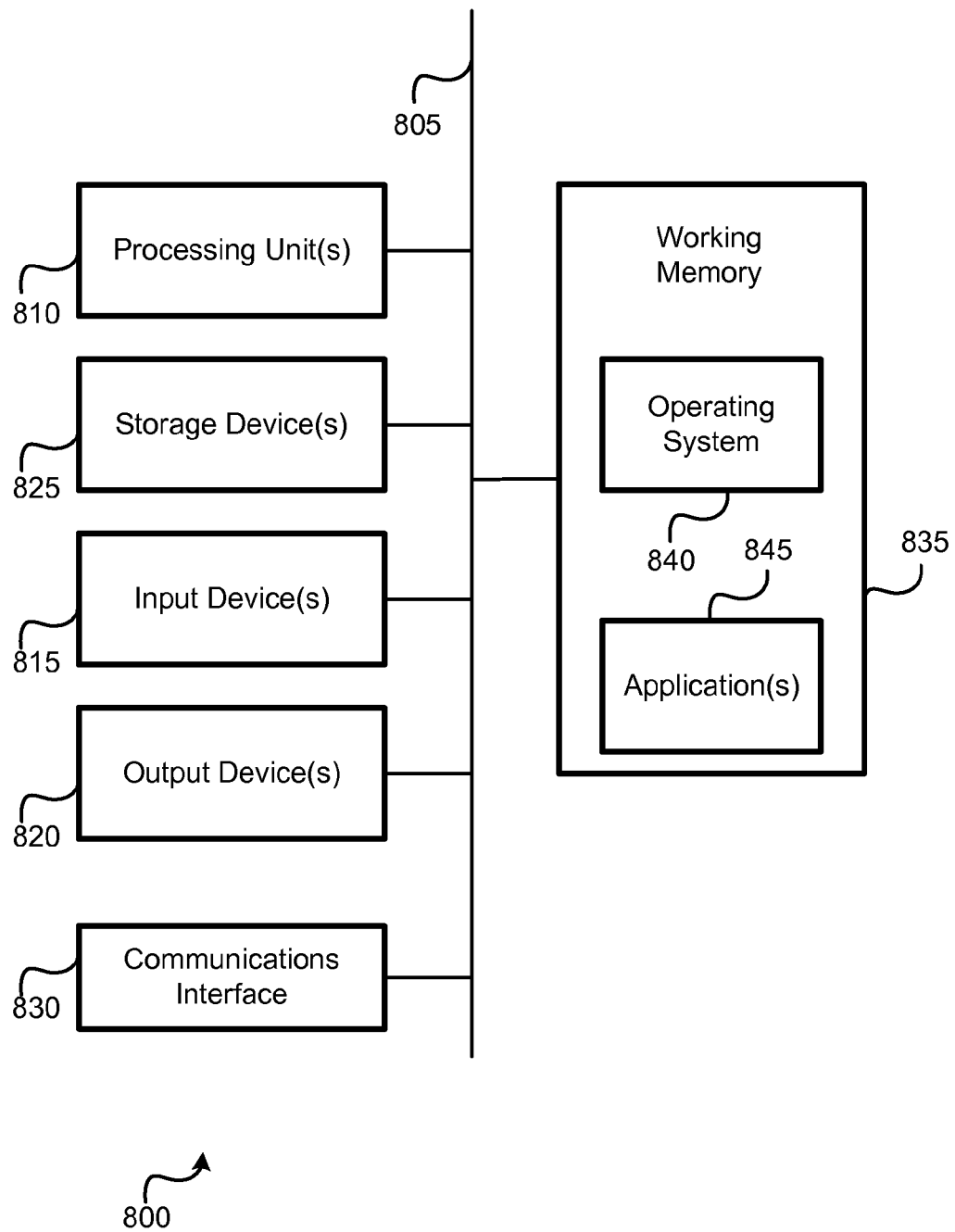
FIG. 8 illustrates an embodiment of a computer system.

FIG. 8 illustrates an embodiment of a computer system 800, which may be configured to execute various components described herein using any combination of hardware and/or software. For example, one or more computer systems 800 can be configured to execute components of the CHIMPS 110 shown in systems 200 and 300 if FIGS. 2 and 3, including the API 260 and DPL 270, as well as the encoder 210, end user device 140, and/or other components of the systems described in relation to FIGS. 1-3. FIG. 8 provides a schematic illustration of one embodiment of a computer system 800 that can perform the methods provided by various other embodiments, such as the methods described in relation to FIGS. 5-7. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations.

The computer system 800 is shown comprising hardware elements that can be electrically coupled via a bus 805 (or may otherwise be in communication, as appropriate). The hardware elements may include processing unit(s) 810, which can include without limitation one or more general-purpose processors, one or more special-purpose processors (such as digital signal processors, graphics acceleration processors, and/or the like), and/or other processing structure, which can be configured to perform one or more of the methods described herein, including the methods described in relation to FIGS. 5-7, by, for example, executing commands stored in a memory. The computer system 800 also can include one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage. This can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 can also include a communications interface 830, which can include wireless and wired communication technologies. Accordingly, the communications interface can include a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communications interface 830 can therefore permit the computer system 800 to be exchanged with other devices and components of a network.

In many embodiments, the computer system 800 will further comprise a working memory 835, which can include a RAM or ROM device, as described above. Software elements, shown as being located within the working memory 835, can include an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 5-7, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processing unit(s) 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit(s) 810 to perform one or more procedures of the methods described herein. Additionally or alternatively, portions of the methods described herein may be executed through specialized hardware.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of providing media streaming via a data communications network, the method comprising:
   receiving a stream of data representing first media source;
   obtaining timing information of the stream of data;
   receiving, via the data communications network, a request to stream the first media source;
   creating, with a processing unit, a manifest that includes:
      information for streaming one or more segments of the first media source via the data communications network,
      information for streaming one or more segments of a second media source, distinct from the first media source,
      a requested length of the one or more segments of the second media source, and
      offset information for streaming the one or more segments of the second media source, the offset information based on the timing information of the stream of data and indicative of a value by which at least one timestamp of the one or more segments of the second media source is to be offset; and
   sending, via the data communications network, the manifest.

2. The method of providing media streaming via a data communications network, as recited in claim 1, further comprising providing an application programming interface (API), wherein the request to stream the first media source is received via the API.

3. The method of providing media streaming via a data communications network, as recited in claim 1, wherein creating the manifest further includes providing, in the manifest, an indication of a discontinuity in the stream of the first media source.

4. The method of providing media streaming via a data communications network, as recited in claim 3, further comprising:
   determining a type of client associated with the request to stream the first media source;
   wherein providing the indication of the discontinuity is based on the determination of the type of client.

5. The method of providing media streaming via a data communications network, as recited in claim 1, wherein obtaining the timing information of the stream of data comprises:
   sending a request for the timing information; and
   receiving a response to the request, the response including the timing information.

6. The method of providing media streaming via a data communications network, as recited in claim 5, further comprising:
   receiving an indication of a period of time in the first media source designated for advertising;
   wherein sending the request for the timing information is based on the receipt of the indication of the period of time in the first media source designated for advertising.

7. The method of providing media streaming via a data communications network, as recited in claim 1, wherein the timing information of the stream of data includes one or more timestamps associated with one or more segments of the stream of data.

8. A server for providing media streaming via a data communications network, the server comprising:
a communications interface;
a memory; and
a processing unit coupled to the communications interface and the memory, the processing unit configured to cause the server to:
receive a stream of data representing first media source;
obtain timing information of the stream of data;
receive, via the communications interface, a request to stream the first media source;
create a manifest that includes:
information for streaming one or more segments of the first media source via the data communications network,
information for streaming one or more segments of a second media source, distinct from the first media source,
a requested length of the one or more segments of the second media source, and
offset information for streaming the one or more segments of the second media source, the offset information based on the timing information of the stream of data and indicative of a value by which at least one timestamp of the one or more segments of the second media source is to be offset; and
send, via the communications interface, the manifest.

9. The server for providing media streaming via a data communications network, as recited in claim 8, wherein the processing unit is further configured to cause the server to provide an application programming interface (API), wherein the request to stream the first media source is received via the API.

10. The server for providing media streaming via a data communications network, as recited in claim 8, wherein the processing unit is configured to cause the server to create the manifest by providing, in the manifest, an indication of a discontinuity in the stream of the first media source.

11. The server for providing media streaming via a data communications network, as recited in claim 10, wherein the processing unit is further configured to cause the server to:
determine a type of client associated with the request to stream the first media source;
wherein providing the indication of the discontinuity is based on the determination of the type of client.

12. The server for providing media streaming via a data communications network, as recited in claim 8, wherein the processing unit is configured to cause the server to obtain the timing information of the stream of data by:
sending a request for the timing information; and
receiving a response to the request, the response including the timing information.

13. The server for providing media streaming via a data communications network, as recited in claim 12, wherein the processing unit is further configured to cause the server to:
receive an indication of a period of time in the first media source designated for advertising;
wherein sending the request for the timing information is based on the receipt of the indication of the period of time in the first media source designated for advertising.

14. The server for providing media streaming via a data communications network, as recited in claim 8, wherein the timing information of the stream of data includes one or more timestamps associated with one or more segments of the stream of data.

15. A non-transitory computer-readable medium having instructions embedded thereon for providing media streaming via a data communications network, the instructions, when executed by a computer, cause the computer to perform functions including:
receiving a stream of data representing first media source;
obtaining timing information of the stream of data;
receiving a request to stream the first media source;
creating a manifest that includes:
information for streaming one or more segments of the first media source via the data communications network,
information for streaming one or more segments of a second media source, distinct from the first media source,
a requested length of the one or more segments of the second media source, and
the manifest further includes offset information for streaming the one or more segments of the second media source, the offset information based on the timing information of the stream of data and indicative of a value by which at least one timestamp of the one or more segments of the second media source is to be offset; and
sending the manifest.

16. The computer-readable medium, as recited in claim 15, further comprising instructions for causing the computer to provide an application programming interface (API), wherein the request to stream the first media source is received via the API.

17. The computer-readable medium, as recited in claim 15, wherein the instructions for creating the manifest further include instructions for providing, in the manifest, an indication of a discontinuity in the stream of the first media source.

18. The computer-readable medium, as recited in claim 17, further including instructions for causing the computer to:
determine a type of client associated with the request to stream the first media source;
wherein providing the indication of the discontinuity is based on the determination of the type of client.

19. The computer-readable medium, as recited in claim 15, wherein the instructions for obtaining the timing information of the stream of data further include instructions for causing the computer to:
send a request for the timing information; and
receive a response to the request, the response including the timing information.

20. The computer-readable medium, as recited in claim 19 further comprising instructions for causing the computer to:
receive an indication of a period of time in the first media source designated for advertising;
wherein sending the request for the timing information is based on the receipt of the indication of the period of time in the first media source designated for advertising.

* * * * *